United States Patent
Haenen et al.

(10) Patent No.: US 11,674,046 B2
(45) Date of Patent: Jun. 13, 2023

(54) AQUEOUS REACTION LIQUID

(71) Applicant: Canon Production Printing Holding B.V., Venlo (NL)

(72) Inventors: Marcel J. H. M. Haenen, Venlo (NL); Guido G. Willems, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 113 days.

(21) Appl. No.: 17/313,064

(22) Filed: May 6, 2021

(65) Prior Publication Data
US 2021/0363374 A1 Nov. 25, 2021

(30) Foreign Application Priority Data

May 19, 2020 (EP) .................................. 20175342

(51) Int. Cl.
*C09D 11/54* (2014.01)
*B41J 2/21* (2006.01)
(Continued)

(52) U.S. Cl.
CPC ............ *C09D 11/54* (2013.01); *B41J 2/2107* (2013.01); *B41M 5/0017* (2013.01); *C08K 5/053* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,591,018 A 1/1997 Takeuchi
6,001,899 A * 12/1999 Gundlach ............ C09D 179/04
523/160
(Continued)

FOREIGN PATENT DOCUMENTS

EP  3 476 906 A1  5/2019
EP  3 647 485 A1  5/2020
(Continued)

OTHER PUBLICATIONS

European Search Report, issued in Application No. 20 17 5342, dated Oct. 6, 2020.

*Primary Examiner* — Manish S Shah
(74) *Attorney, Agent, or Firm* — Birch, Stewart, Kolasch & Birch, LLP

(57) ABSTRACT

The present invention relates to an aqueous reaction liquid composition including an anti-deforming agent. selected from the group consisting of a choline salt (formate, acetate, chloride), a guanidine salt (formate, acetate, chloride), trimethylglycine (betaine), potassium formate and ammonium nitrate. The present invention also relates to an aqueous reaction liquid composition including a Deep Eutectic Solvent (DES) having urea in combination with an anti-deforming agent as disclosed above. In another aspect the invention relates to an ink set including such aqueous reaction liquid composition and an ink composition, preferably a pigmented ink composition. In another aspect the present invention relates to a printing method including application of an aqueous reaction liquid composition according to the present invention and application of an ink composition.

18 Claims, 4 Drawing Sheets

(51) Int. Cl.
  *B41M 5/00* (2006.01)
  *C08K 5/053* (2006.01)
  *C08K 5/098* (2006.01)
  *C08K 5/17* (2006.01)
  *C08K 5/19* (2006.01)
  *C08K 5/21* (2006.01)
  *C09D 11/037* (2014.01)
  *C09D 11/106* (2014.01)

(52) U.S. Cl.
  CPC .............. *C08K 5/098* (2013.01); *C08K 5/175* (2013.01); *C08K 5/19* (2013.01); *C08K 5/21* (2013.01); *C09D 11/037* (2013.01); *C09D 11/106* (2013.01)

(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
  See application file for complete search history.

(56) References Cited

U.S. PATENT DOCUMENTS

| | | | |
|---|---|---|---|
| 6,005,022 A | * | 12/1999 | Schwarz, Jr. .......... C09D 11/30 523/160 |
| 6,419,352 B1 | | 7/2002 | Kubota et al. |
| 6,786,588 B2 | | 9/2004 | Koyano et al. |
| 8,523,342 B2 | | 9/2013 | Takaori et al. |
| 2003/0207121 A1 | * | 11/2003 | McGee .................... C08J 7/046 428/422.8 |
| 2005/0117007 A1 | | 6/2005 | Kosaka |
| 2008/0075960 A1 | * | 3/2008 | Pocius ................. C09D 133/08 525/88 |
| 2011/0303113 A1 | | 12/2011 | Sarkisian et al. |
| 2012/0019588 A1 | | 1/2012 | Mubarekyan |
| 2012/0098883 A1 | | 4/2012 | Matsuyama et al. |
| 2012/0314000 A1 | | 12/2012 | Sarkisian et al. |
| 2013/0050363 A1 | * | 2/2013 | Usui ..................... B41J 2/2107 347/100 |
| 2014/0055520 A1 | | 2/2014 | Inumaru et al. |
| 2017/0292035 A1 | * | 10/2017 | Saito .................... D06P 1/5285 |

FOREIGN PATENT DOCUMENTS

| WO | WO 2013/131924 A1 | 9/2013 |
|---|---|---|
| WO | WO 2014/051547 A1 | 4/2014 |

\* cited by examiner

AQUEOUS REACTION LIQUID

FIELD OF THE INVENTION

The present invention relates to an aqueous reaction liquid suitable to be used in ink-jet printing in particular for improving the print quality by immobilizing an image printed on a substrate, in particular a reaction liquid that is suitable to be applied onto a recording substrate by means of an ink-jet imaging device.

BACKGROUND ART

In the field of ink jet printing, reaction liquids are used for improving print quality. The reaction liquid comprises a component that reacts with a component in the ink, e.g. the colloidal stability of dispersed pigment particles (present in the ink) is imparted by a metal salt (present in the reaction liquid). Therefore, upon contact between the ink composition and the reaction liquid, the dispersed pigment particles destabilize, agglomerate and are pinned to the recording substrate. Therefore, (inter) color bleeding and coalescence on machine coated (MC) papers may be prevented or at least mitigated, which is an improvement of the print quality. The optical density (OD) is increased and show-through is decreased on plain papers.

Reaction liquids are known from the prior art and usually comprise either a strong acidic compound or a (poly)valent metal salt, having the function of a fixer and/or crashing agent.

Reaction liquids, also termed reaction solutions, primer liquids, (pre-)treatment liquids or compositions, processing liquids or ink-receiving solutions, comprising polyvalent metal salts are known from the prior art, in particular from U.S. Pat. Nos. 6,419,352; 6,786,588; 8,523,342; 5,591,018; US 2011/0303113; US 2012/0098883; US 2012/0314000; and WO 2014/051547.

Published US Patent Application 2012/0019588 discloses fixer fluids, for ink-jet printing comprising a metal carboxylate salt as a fixer agent. In particular calcium acetate, calcium propionate, calcium butyrate, calcium bromide, calcium carbonate, calcium chloride, calcium citrate, calcium cyanamide, calcium phosphate, calcium lactate, calcium nitrate, calcium oxalate and calcium sulfate are disclosed as fixer agents.

Published US Patent Application 2014/0055520 discloses an ink-receiving solution comprising at least one metal salt, in particular calcium chloride.

The reaction liquids comprising a (poly)valent metal salt usually comprise a conjugate base of acids or a halide as an anion.

It is a disadvantage of the known reaction liquids that in combination with ink compositions, a relatively large amount of water is added to the surface of a print substrate, which may cause severe media deformation, in particular cockling a well-known phenomenon in the art.

It is therefore an object of the present invention to provide an aqueous reaction liquid composition that prevents or at least mitigates severe media deformation.

SUMMARY OF THE INVENTION

This object is at least partially obtained by providing an aqueous reaction liquid composition comprising an anti-deforming agent, selected from the group consisting of a choline salt, a guanidine salt, trimethylglycine (betaine), potassium formate and ammonium nitrate, wherein the anti-deforming agent is present in the aqueous reaction liquid in an effective amount such that the water activity of the aqueous reaction liquid composition is below 0.9, preferably below 0.8, more preferably below 0.7, the water activity of the aqueous reaction liquid being determined by dividing the vapor pressure of the aqueous reaction liquid by the vapor pressure of pure water, both determined at 25° C. and in accordance with ASTM D6377.

The anti-deforming agent present in the aqueous reaction liquid composition prevents or at least mitigates interaction of the water added to the print substrate by applying the aqueous reaction liquid composition and the ink composition(s) with paper fibers (print substrate). Without wanting to be bound to any theory, it is believed that, the aqueous reaction liquid composition is capable of doing this because the anti-deforming agent decreases the water activity (Wa) of the aqueous reaction liquid composition significantly. An effective amount of anti-deforming agent to bring the water activity of the aqueous reaction liquid below 0.9 is very much dependent on the type of the anti-deforming agent, in particular on its molecular weight. In the context of the present invention, an effective amount therefore is to be interpreted as such an amount that the desired water activity of the aqueous reaction liquid is obtained. The effective amount of a specific anti-deforming agent can be easily determined by gradually (e.g. in steps) adding the specific anti-deforming agent to an aqueous reaction liquid and determining the gradual decrease (after each step) of the water activity of the aqueous reaction liquid. No extensive experimentation is required for this procedure.

In an embodiment, the choline salt is selected from the group consisting of choline-formate, choline-acetate and choline-chloride.

These choline derivatives are capable of partially dissolving crystalline parts of cellulose present in print substrates, which hence induces tension relaxation in the (wetted) print substrates and thus show (further) improved cockle behavior.

In an embodiment, the guanidine salt is selected from the group consisting of guanidine-formate, guanidine-acetate and guanidine-chloride.

An additional advantage of low water activity is that nozzle blockage does not easily occur in a print head printing the aqueous reaction liquid composition. This is because drying-in in the nozzles occurs very slowly or not at all.

In an embodiment, the anti-deforming agent is selected from the group consisting of choline-formate, choline-acetate, trimethylglycine (betaine) and guanidine-formate.

In an embodiment, the aqueous reaction liquid composition additionally comprises urea as to form a deep eutectic solvent with the anti-deforming agent.

It is believed (and shown) that aqueous reaction liquid compositions comprising a deep eutectic solvent (DES) are capable of further reducing the water activity of the aqueous reaction liquid compositions and hence further reduce cockling behavior.

In an embodiment, the deep eutectic solvent comprises urea combined with an anti-deforming agent selected from the group consisting of: trimethylglycine (betaine), potassium formate and ammonium nitrate.

Of these, trimethylglycine/urea is also capable of partially dissolving crystalline parts of cellulose present in print substrates, which hence induces tension relaxation in the (wetted) print substrates and thus show (further) improved cockle behavior.

Potassium formate/urea and ammonium-nitrate/urea show a very low viscosity at high concentrations of components and are capable of obtaining aqueous reaction liquids with very low water activities and are therefore in particular highly suitable for postponed cockle behavior.

In an embodiment, the molar ratio anti-deforming agent: urea is between 1:0.5 and 1:2.0.

In an embodiment, the deep eutectic solvent is present in a total effective amount such that the water activity of the aqueous reaction liquid composition is below 0.9, preferably below 0.8, more preferably below 0.7, the water activity of the aqueous reaction liquid being determined by dividing the vapor pressure of the aqueous reaction liquid by the vapor pressure of pure water, both determined at 25° C. and in accordance with ASTM D6377.

The aqueous reaction liquid composition according to the present invention may further comprise a metal salt, wherein the metal salt preferably comprises a polyvalent metal ion. More preferably the polyvalent metal ion is selected from the group consisting of: $Ca^{2+}$, $Mg^{2+}$, $Sr^{2+}$, $Zn^{2+}$, $Cu^{2+}$, $Ni^{2+}$, $Fe^{3+}$, $Cr^{3+}$ and $Al^{3+}$. $Mg^{2+}$ and $Ca^{2+}$ are most preferred for HSE reasons.

The metal salt may comprise any suitable anion, e.g. a conjugated base of acids in particular soluble organic acids or a halide as an anion. Preferred anions are nitrate, sulfate, formate, acetate, and propionate.

The metal salt is preferably present in an amount of at least 15 wt % relative to the total aqueous reaction liquid composition, more preferably between 20 wt % and 60 wt %.

In another aspect the present invention pertains to an ink set comprising an aqueous reaction liquid as described above and an ink composition comprising dispersed particles that upon contact with the aqueous reaction liquid composition destabilize and preferably agglomerate.

In an embodiment, the dispersed particles comprised in the ink composition comprise pigment particles.

In an embodiment, the dispersed particles comprised in the ink composition comprise latex particles.

In yet another aspect, the present invention pertains to a method of printing comprising the steps of:
  providing an aqueous reaction liquid composition according to present invention; an ink composition comprising dispersed particles that upon contact with the aqueous reaction liquid composition destabilize, and preferably agglomerate; and a print substrate;
  applying the aqueous reaction liquid composition to a surface of the print substrate;
  applying the ink composition to a surface of the print substrate.

In an embodiment, the aqueous reaction liquid composition is first applied to the surface of the print substrate and subsequently the ink composition is applied to the surface of the print substrate comprising the aqueous reaction liquid composition.

In an embodiment, the reaction liquid is applied by ink jet.

In an embodiment, the reaction liquid is applied to the surface of the print substrate in a pattern.

In an embodiment, the reaction liquid is applied to the surface of the print substrate in accordance with an image to be formed by subsequently printing the ink composition.

In an embodiment, the ink composition is image-wise applied by ink jet.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

DETAILED DESCRIPTION

Figure 1:
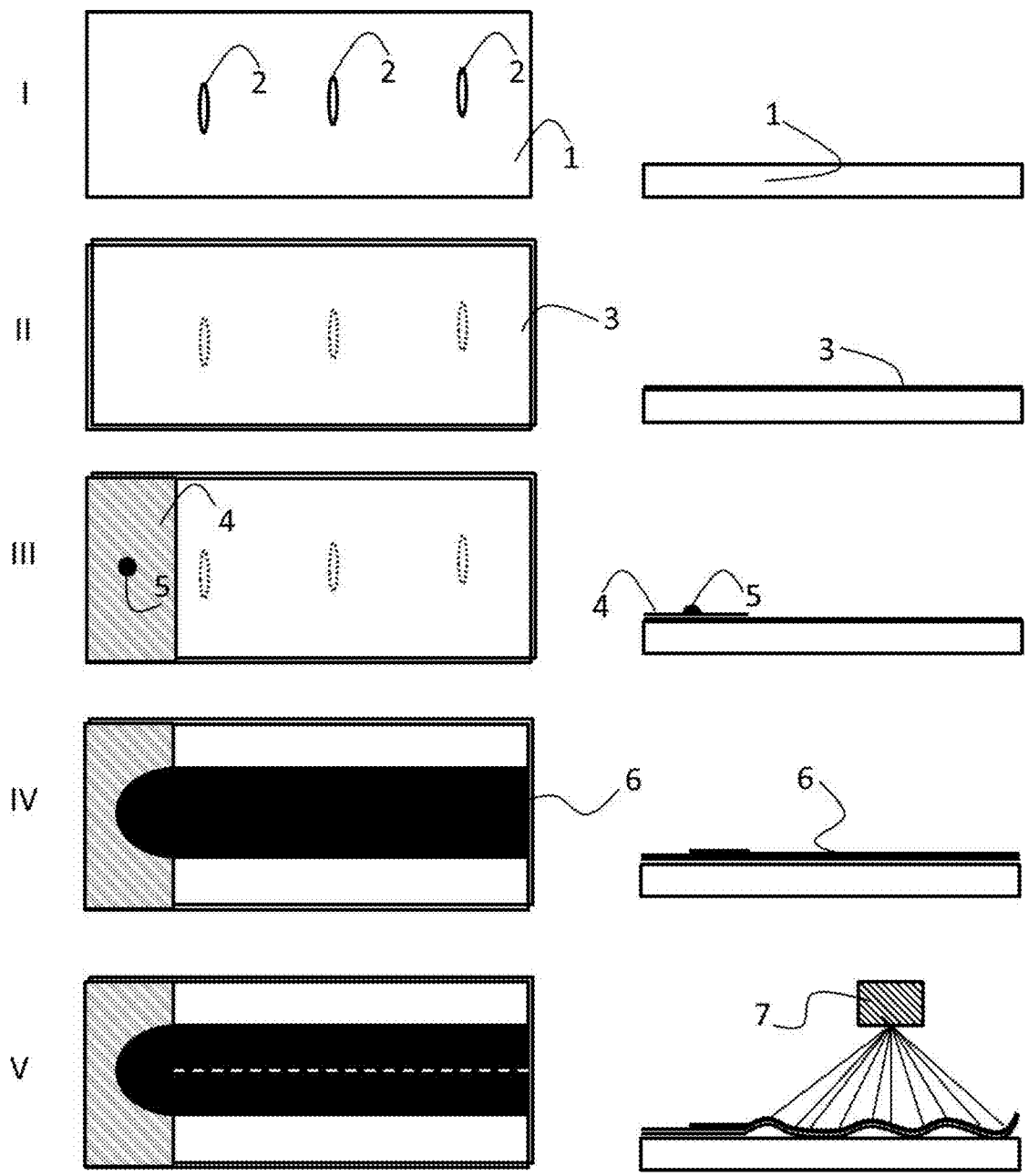
FIG. 1 shows a schematic representation of the cockling test method and set-up used in the present invention.

In aqueous inkjet printing, in particular in cut sheet printing (i.e. separate print substrates instead of a continuous feed of a web of print substrate), the substrate needs to be immobilized when printing the image on top of the substrate, among others for image registration purposes. In cut sheet printing, various methods for immobilizing the substrates are known in the art, one of which comprises using suction to hold down the substrate sheets on a print surface. In an embodiment, a suction box is arranged in the printing zone of a printer with a perforated belt running over the surface of the suction belt for substrate transport underneath the printing modules (comprising inkjet print heads). The suction creates a partial vacuum that holds down the substrate sheets onto the surface of the perforated transport belt.

For image quality purposes, in inkjet often (aqueous) reaction liquid compositions are used that react with ink components, in particular destabilize dispersed ink components in order to initially fixate the printed image to the surface of the substrate (recording medium).

In such printing method, the substrate is loaded with aqueous reaction liquid composition and on top of that ink compositions, providing a lot of liquids, in particular water, to the surface of the print substrate. It is known that when (uncoated) papers (print substrate) are wetted by water based compositions at coverages exceeding 2 g/m² substrate deformation, in particular cockling, starts almost immediately, but at least within 5 ms.

In order to flatten the deformed sheets (or prevent cockling in the first place), high under pressures e.g. partial vacuum of −1500 Pa (meaning 1500 Pa below atmospheric pressure) or below are required. At these high under pressures, it becomes difficult to move the perforated transport belt over the suction box due to high friction between the transport belt and the suction surface of the suction box. Suction and media transport therefore leads to high energy consumption. Besides difficulties of transporting the substrate sheets underneath the print heads, the used belt will wear fast.

Another issue is that due to different temperature zones in a inkjet printer (i.e. printing zone at relative low temperature, e.g. around 30° C. and a drying/fixation zone at relative high temperature, e.g. 65° C. or above), multiple transport belts (or other transport mechanisms) are required to prevent excessive heating and cooling in the respective temperature zones. Segmentation of substrate transport in the different temperature zones in the inkjet printer provides a solution for this problem. However, this implies that substrate sheets need to be transferred from one transport belt (or other transport mechanism) to another, which needs the release of a wetted substrate sheet when it is transferred from the printing zone (where the substrate is wetted) to the drying/fixation zone. During said transfer, the wetted substrate sheets tend to deform (within 5 ms. as described above). The downstream arranged transport mechanism even needs a higher under pressure in order to flatten the sheets and/or prevent cockling, e.g. partial vacuum of −2500 Pa (meaning 2500 Pa below atmospheric pressure) or below.

A partial solution to above problem is using transport devices that are less sensitive to wear, such as a transport drum with integrated suction box. This is, however, an expensive solution to only a part of the problem. Temperature segmentation inside a printer still requires transfer of printed substrates from one transport mechanism to another.

It is therefore desirable to postpone the moment that the (first) cockles appear. Inventors have surprisingly found that this can be obtained by providing an aqueous reaction liquid that comprises an anti-deforming agent in accordance with the present invention as stated above. Without wanting to be bound to any theory, it is thought that cockling is reduced by avoiding interaction between the water added to the surface of the substrate and the paper fibers. This can be achieved by reducing the water activity of the applied liquids, in particular the water activity of the aqueous reaction liquid composition.

An additional advantage of the present invention is that the postponement of the appearance of cockling enables substrate sheet transport at much lower suction forces (e.g. −500 Pa or less), such that relatively cheap sheet transport mechanisms (suction box and perforated belts) can be used for sheet transport at a relatively low energy consumption.

Water Activity

Water activity is defined as the amount of unbound water in a system and is indicated as Wa. Water activity equals the vapor pressure of a liquid comprising a solute (in case an aqueous solution comprising the solute) divided by the vapor pressure of pure water. Wa is a measurable quantity, for example a MiniVap VPXpert (grabner-instruments) is capable of determining Wa directly.

Reaction Liquid

Reaction liquids according to the present invention comprise an anti-deforming agent as stated in claim 1.

Anti-Deforming Agent

When anti-deforming agents as stated above and in claim 1 are present in an aqueous reaction liquid composition in accordance with the present invention, hydrogen bonding between water and cellulosic fibers in the substrate is prevented or at least mitigated, leading to a decrease of the water activity in the system and hence less substrate deformation such as cockling. The water present in the system (i.e. substrate, aqueous reaction liquid composition and ink composition(s)) is considered to be more or less 'unbound' or 'free' in the system, e.g. not held by hydrogen bonding. As disclosed above, water activity (Wa) is a measure for the amount of unbound or free water in a system.

Suitable examples of such anti-deforming agents are (but not limited to):
a choline salt (e.g. choline-formate, choline-acetate, choline-chloride), a guanidine salt (e.g. guanidine-formate, guanidine-acetate, guanidine-chloride), trimethylglycine (betaine), potassium formate and ammonium nitrate.

Deep Eutectic Solvent

Deep Eutectic Solvents (DES) are systems formed from a eutectic mixture of Lewis or Brønsted acids and bases which may contain a variety of anionic and/or cationic species. DES are classified as types of ionic solvents with special properties. DES incorporate one or more compound in a mixture form, to give a eutectic with a melting point much lower than either of the individual components.

Suitable examples of DES are (but not limited to): urea combined with any of the anti-deforming agents disclosed above, in particular trimethylglycine (betaine), potassium formate and ammonium nitrate.

Table 1 shows the molar ratio relating to the Eutectic minima of exemplified DES compositions. It is to be noted that around the Eutectic composition there is still a significant reduction of the melting point of the (eutectic) composition. The table merely shows the eutectic minima (i.e. molar ratio at which melting point reduction is at its maximum).

TABLE 1

| molar ratio of Eutectic mixtures | |
|---|---|
| DES | molar ratio (mol:mol) |
| trimethylglycine:urea | 1:1.5 |
| potassium-formate:urea | 2:1 |
| ammonium-nitrate:urea | 1:1 |
| Choline-chloride:urea | 1:2 |
| Choline-acetate:urea | 1:2 |
| Choline-formate:urea | 1:2 |

Metal Salts

Besides trimethylglycine/urea, the anti-deforming agent present in an aqueous reaction liquid is capable of destabilizing dispersed components, e.g. upon contact with a dispersed polymer and/or pigment containing ink composition. However, additional metal salts may be added to the aqueous reaction liquid composition according to the present invention.

Metal salts that can be suitably used in reaction liquids according to the present invention comprise monovalent metal ions such as $Li^+$, $Na^+$, $K^+$, $Hg^+$, $Cu^+$ and $Ag^+$. However, it is preferred that thin layers of the reaction liquid can be applied to a print substrate, in order to prevent deformation of the print substrate (in particular paper-like substrates). Therefore, in order to provide an effective reaction liquid in thin layers, a salt providing a relatively high ionic strength is preferred.

In the context of the present invention, ionic strength is defined in accordance with equation 1:

$$I = \frac{1}{2} \times \sum_{i=1}^{n} (c_i \times z_i^2) \qquad \text{equation 1}$$

wherein:
l is the ionic strength in M (i.e. mol/l);
$c_i$ is the concentration of ion i;
$z_i$ is the valence of ion i;

For example, the ionic strength of a 0.5 mol/l $Na_2SO_4$ solution is:

$$0.5*(2*0.5*(1)^2+1*0.5*(-2)^2)=1.5 \text{ M}$$

Another criterion to be observed is that the solubility of the selected salt is high enough to be able to prepare an effective reaction solution. For these reasons, polyvalent metal ions are preferred, such as: $Ca^{2+}$, $Mg^{2+}$, $Sr^{2+}$, $Zn^{2+}$, $Cu^{2+}$, $Ni^{2+}$, $Fe^{3+}$, $Cr^{3+}$ and $Al^{3+}$. Of these, $Mg^{2+}$ and $Ca^{2+}$ are most preferred for HSE reasons.

Suitable anions are conjugated bases of acids, in particular soluble organic acids or a halide anion. Preferred anions are nitrate, sulfate, formate, acetate, and propionate.

In general, the reaction liquids according to the present invention comprise between 10 wt % and 60 wt %, preferably between 15 w % and 50 wt %, more preferably between 20 wt % and 40 wt % of the multi-valent metal salt, with reference to the total composition.

The amount of salt is however limited to the maximum solubility of the salt. The saturation degree (actual concentration/maximum solubility*100%) of the salt in the reaction liquid is in general between 10% and 100%, preferably between 15% and 95%, more preferably between 20% and 80%.

Reaction liquids may comprise additives such as cosolvents, pH-regulators and surfactants. Reaction liquids according to the present invention can be suitable used on plain papers and machine coated (MC) papers, which are well known in the art.

Cosolvents

In order to meet jettability requirements, cosolvents may be added to the reaction liquid. Cosolvents may have multiple functions, e.g. adapting the rheological behavior of the reaction liquid and/or preventing drying of the reaction liquid in the imaging device or on the nozzle surface of the imaging device, which drying may lead to precipitation of the metal salt in the imaging device or on the nozzle plate. Cosolvents may also be used to improve penetration of the main solvent (water) into the print substrate, such cosolvents are also termed penetrants. The type of cosolvents used is not limited to any kind, as long as the effect of the present invention is preserved. Cosolvents similarly used in (aqueous) ink compositions may be suitably used in reaction liquids according to the present invention. Examples of suitable cosolvents are water-soluble organic solvents such as polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

Examples of water-soluble organic solvents include (but are not limited to): glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, petaerythritol ethoxylate, polyethylene glycol (di)methylethers preferably having a molecular weight of between 200 gram/mol and 1000 gram/mol, tri-methylolpropane, diglycerol (diglycerin), trimethylglycine (betaine), N-methylmorpholine N-oxide, decaglyserol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol monoethyl ether, diethylene glycol mono-propyl ether, diethylene glycol mono-butyl ether, triethylene glycol monomethyl ether, triethylene glycol monoethyl ether, triethylene glycol mono-propyl ether, triethylene glycol mono-butyl ether, tetraethylene glycol monomethyl ether, tetraethylene glycol monoethyl ether, propylene glycol mono-butyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol-monoethyl ether acetate, 1,2-hexanediol, 1,2-pentanediol and 1,2-butanediol.

In an embodiment, a mixture of the water-soluble organic solvents may be comprised in a reaction liquid according to the present invention. The individual organic solvents preferably being present in an amount of 1 weight % to 40 weight %, more preferably in an amount of 3 weight % to 30 weight %, even more preferably in an amount of 5 weight % to 20 weight %, relative to the total ink composition.

pH-Regulators pH-regulators may be added to the reaction liquid to optimize the pH of the reaction liquid in order to meet the pH requirements specified for the used print head. In general, the pH specification of the print head is in the alkaline region (i.e. pH>7). Therefore, alkaline pH-regulators are preferred. Examples of suitable pH-regulators are (but are not limited to): ammonia, (secondary and tertiary) amines, amino alcohols, in particular N-alkyl-dialkanolamines. Specific examples of suitable amino alcohols are: triethanolamine, N-metyldiethanolamine, N-ethyldiethanolamine, N-n-butyl-monoethanolamine and N-n-butyl-diethanolamine.

Usually pH-regulators are present in a small amount in the reaction liquid, in particular less than 1 wt % with respect to the total reaction liquid composition. However, pH-regulators can be suitably applied in any amount until the desired pH has been reached and as long as the effect of the present invention is preserved.

Surfactants

Surfactants may be added to the reaction liquid to improve the spreading behavior of the reaction liquid on the print substrate. Examples of suitable surfactants are not limited to any kind, as long as the effect of the present invention is preserved.

Examples of the surfactant include nonionic surfactants, cationic surfactants, anionic surfactants, amphoteric surfactants, in particular betaine surfactants, silicone surfactants, and fluorochemical surfactants. Particularly, at least one selected from acetylene surfactants, silicone surfactants and fluorochemical surfactants.

Examples of a cationic surfactant include: aliphatic amine salts, aliphatic quarternary ammonium salts, benzalkonium salts, benzethonium chloride, pyridinium salts, imidazolinium salts.

Examples of an anionic surfactant include: polyoxyethylene alkylether acetic acid salts, dodecylbenzene sulfonic acid salts, lauric acid salts, and salts of polyoxyethylene alkylether sulfate, an aliphatic acid soap, an N-acyl-N-methyl glycin salt, an N-acyl-N-methyl-β-alanine salt, an N-acylglutamate, an acylated peptide, an alkylsulfonic acid salt, an alkylbezenesulfonic acid salt, an alkylnaphthalenesulfonic acid salt, a dialkylsulfo succinate (e.g. sodium dioctyl sulfosuccinate (DSS); alternative names: docusate sodium, Aerosol OT and AOT), alkylsulfo acetate, α-olefin sulfonate, N-acyl-methyl taurine, a sulfonated oil, a higher alcohol sulfate salt, a secondary higher alcohol sulfate salt, an alkyl ether sulfate, a secondary higher alcohol ethoxysulfate, a polyoxyethylene alkylphenyl ether sulfate, a monoglysulfate, an aliphatic acid alkylolamido sulfate salt, an alkyl ether phosphate salt and an alkyl phosphate salt.

Examples of an amphoteric surfactant include: a carboxybetaine type, a sulfobetaine type, an aminocarboxylate salt and an imidazolium betaine.

Examples of a nonionic surfactant include: polyoxyethylene alkylether, polyoxypropylene polyoxyethylene alkylether, a polyoxyethylene secondary alcohol ether, a polyoxyethylene alkylphenyl ether, a polyoxyethylene sterol ether, a polyoxyethylenelanolin derivative polyoxyethylene polyoxypropylene alkyl ether, polyoxyethylene alkylester, a polyoxyethyleneglycerine aliphatic acid ester, a polyoxyethylene castor oil, a hydrogenated castor oil, a polyoxyethylene sorbitol aliphatic acid ester, a polyethylene glycols aliphatic acid ester, an aliphatic acid monoglyceride, a polyglycerine aliphatic acid ester, a sorbitan aliphatic acid ester, polyoxyethylene sorbitan aliphatic ester, a propylene glycol aliphatic acid ester, a cane sugar aliphatic acid ester, an aliphatic acid alkanol amide, polyoxyethylene alkylamide, a polyoxyethylene aliphatic acid amide, a polyoxyethylene alkylamine, an alkylamine oxide, an alkoxylated alcohol, an acetyleneglycol, an ethoxylated acetylene glycol, acetylene alcohol.

As the fluorochemical surfactant, a surfactant having 2 to 16 fluorine-substituted carbon atoms is preferred, and a surfactant having 4 to 16 fluorine-substituted carbon atoms is more preferred. When the number of fluorine-substituted carbon atoms is less than 2, the effect peculiar to a fluorochemical surfactant may not be obtained. When it is more than 16, degradation in storage stability etc. may arise.

Examples of the fluorochemical surfactants include nonionic fluorochemical surfactants, anionic fluorochemical surfactants, and amphoteric fluorochemical surfactants. Examples of the nonionic fluorochemical surfactants include perfluoroalkyl phosphoric acid ester compounds, perfluoroalkyl ethylene oxide adducts, and polyoxyalkylene ether polymer compounds having perfluoroalkyl ether groups as side chains. Among these, polyoxyalkylene ether polymer compounds having perfluoroalkyl ether groups as side chains are preferable because they are low in foaming property.

As the fluorochemical surfactants, commercially available products may be used.

Examples of the commercially available products include SURFLON S-HI, S-112, S-113. S-121, S-131, S-132, S-141 and S-145 (all of which are produced by Asahi Glass Co., Ltd.), FLUORAD FC-93, FC-95, FC-98, FC-129, FC-135, FC-170C, FC-430 and FC-431 (all of which are produced by Sumitomo 3M Limited), MEGAFAC F-470, F-1405 and F-474 (all of which are produced by Dainippon Ink Chemical Industries Co., Ltd.), ZONYL TBS, FSP, FSA, FSN-100, FSN, FSO-100, FSO, FS-300 and UR (all of which are produced by E. I. du Pont de Nemours and Company), FT-110, FT-250, FT-251, FT-400S, FT-150 and FT-400SW (all of which are produced by Neos Company Limited), and POLYFOX PF-136A, PF-156A, PF-151N, PF-154, and PF-159 (all of which are produced by OMNOVA Solutions Inc.). Among these, ZONYL FS-300 (produced by E. I. du Pont de Nemours and Company), FT-110, FT-250, FT-251, FT-400S, FT-150, FT-400SW (produced by Neos Company Limited), and POLYFOX PF-151N (produced by OMNOVA Solutions Inc.) are preferable in that they are excellent in print quality, particularly in color developing ability and in dye-leveling property.

The silicone surfactant is not particularly limited and may be suitably selected in accordance with the intended use.

Examples of the silicone surfactant include side-chain-modified polydimethylsiloxane, both-ends-modified polydimethylsiloxane, one-end-modified polydimethylsiloxane, and side-chain/both-ends-modified polydimethylsiloxane. Polyether-modified silicone surfactants having, as a modified group, a polyoxyethylene group or a polyoxyethylene polyoxypropylene group are particularly preferable because they exhibit excellent physical properties as water-based surfactants.

The silicone surfactant may be suitably synthesized or commercial products may be used. The commercial product is readily available from BYK Chemie GmbH, Shin-Etsu Chemical Co., Ltd., TORAY Dow Corning Silicone Co., Ltd., Nihon Emulsion Co., Ltd., Kyoeisha Chemical Co., Ltd., or the like.

The polyether-modified silicone surfactant is not particularly limited and may be suitably selected in accordance with the intended use. Examples thereof include a compound in which a polyalkylene oxide structure represented by Formula 1 is induced in Si portion side chain of dimethyl polysiloxane.

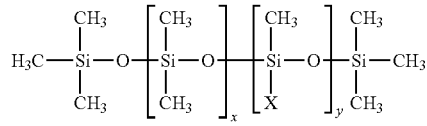

Formula 1 wherein $X = -R(C_2H_4O)_a(C_3H_6O)_bR'$

In Formula 1, x, y, a and b are each an integer; R represents an alkyl group, and R' represents an alkylene group.

As the polyether-modified silicone surfactant/polyalkylene oxide modified silicone, commercial products may be used.

Examples of the commercial products include KF-618, KF-642 and KF-643 (produced by Shin-Etsu Chemical Co., Ltd.); EMALEX-SS-5602 and SS-1906EX (produced by Nihon Emulsion Co., Ltd.); FZ-2105, FZ-2118, FZ-2154, FZ-2161, FZ-2162, FZ-2163 and FZ-2164 (produced by TORAY Dow Corning Silicone Co., Ltd.); and BYK-33, BYK 331, BYK 341, BYK 348, BYK 349, BYK 3455, BYK-387 (produced by BYK Chemie GmbH); Tegowet 240, Tegowet 245, Tegowet 250, Tegowet 260 (produced by Evonik); Silwet L-77 (produced by Sabic), DBE 714 surfactant.

All surfactants mentioned in this section may be used solely, or they may be used in combination of the plural.

Ethoxylated acetylene glycols have a general structure as shown in Formula 2.

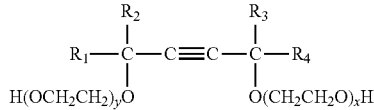

Formula 2

Wherein $R_1$ and $R_4$ are the same or different alkyl radicals having from 3-10, preferably from 3-6 carbon atoms, preferably $R_1$ and $R_4$ are the same and $R_2$ and $R_3$ are the same or different and selected from methyl and ethyl, preferably both $R_2$ and $R_3$ are methyl and x and y are both integers and have a sum in the range of between 1 and 60.

In an embodiment, an ethoxylated acetylene glycol according to Formula 2 is used as a surfactant alone or in combination with other surfactants in an ink composition according to the present invention, wherein x and y are independent of one another and each are in a range of between 0 and 25, preferably between 0 and 20, more preferably between 0 and 15, with the proviso that at least one of x and y is larger the 0.

Specific examples of ethoxylated acetylene glycols are ethoxylated 3-methyl-1-nonyn-3-ol, ethoxylated 7,10-dimethyl-8-hexadecyne-7,10-diol, ethoxylated 4,7-dimethyl-5-decyne-4,7-diol, ethoxylated 2,4,7,9-tetramethyl-5-decyne-4,7-diol, and ethoxylated 2,5,8,11-tetramethyl-6-dodecyne-5,8-diol. These can be used in combination with each other.

Surfactants may be used separately and in combination of the plural.

Inks

Any ink composition comprising dispersed particles that upon contact with the aqueous reaction liquid composition agglomerate. The dispersed particles may be colorant particles, in particular pigment particles and/or latex particles. Examples of suitable inks are aqueous pigmented inks and latex inks, wherein the particles present in the ink (e.g. pigment particles and/or latex particles) are sensitive to reacting with the metal salts present in the primer compositions according to the present invention. Such ink compositions are for example disclosed in the published International Patent Application WO2013/131924, in particular in the Examples and the cited prior art, which are hereby incorporated by reference.

Colorant

The colorant particles may be a pigment or a mixture of pigments, a dye or a mixture of dyes or a mixture comprising pigments and dyes, as long as the colorant is water-dispersed.

Examples of the pigment usable in the present invention include those commonly known without any limitation, and either a water-dispersed pigment or an oil-dispersed pigment is usable. For example, an organic pigment such as an insoluble pigment or a lake pigment, as well as an inorganic pigment such as carbon black, is preferably usable.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination. As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 (Permanent Red 2B(Ca)), C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101 (colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18 and C.I. Pigment Green 36.

In addition to the above pigments, when red, green, blue or intermediate colors are required, it is preferable that the following pigments are employed individually or in combination thereof. Examples of employable pigments include: C.I. Pigment Red 209, 224, 177, and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (CI Pigment Black 7) or metal-based pigments (e.g., copper, iron (CI Pigment Black 11), and titanium oxide; and organic pigments (e.g., aniline black (CI Pigment Black 1).

The amount of the water-insoluble pigment contained in the inkjet ink, as a solid content, is preferably 0.5 weight % to 15 weight %, more preferably 0.8 weight % to 10 weight %, and even more preferably between 1 weight % and 6 weight %. When the amount of the water-insoluble pigment is less than 0.5 weight %, the color developing ability and image density of the ink may degrade. When it is more than 15 weight %, unfavorably, the viscosity of the ink is increased, causing a degradation in ink ejection stability.

Latex Particles

The inkjet ink present in an ink set according to the present invention may contain a water-dispersed resin (latex resin) in view of the pigment fixability to recording media. As the water-dispersed resin, a water-dispersed resin excellent in film formability (image formability) and having high water repellency, high waterfastness, and high weatherability is useful in recording images having high waterfastness and high image density (high color developing ability).

Examples of the water-dispersed resin include synthetic resins and natural polymer compounds.

Examples of the synthetic resins include polyester resins, polyurethane resins, polyepoxy resins, polyamide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymers such as styrene-acrylate copolymer resins, styrene-butadiene copolymer resins.

Examples of the natural polymer compounds include celluloses, rosins, and natural rubbers.

In an embodiment, the water dispersed resin used in the present invention may be made of a resin having a water soluble functional group such as a carboxylic group or a sulfonic group.

In an embodiment, the ink composition according to the present invention comprises a resin having a carboxylic group which has a small dissociation rate from the viewpoint of producing high speed aggregation effect of the water-dispersed resin. Since a carboxylic acid group tends to be influenced by a pH change, a dispersion state changes easily and its aggregation property is high. Examples of resins suitable for use in ink compositions according to the present embodiment are: an acrylic resin, a vinyl acetate resin, a styrene butadiene resin, a vinyl chloride resin, an acrylic styrene resin, a butadiene resin and styrene resin. As for the resin component of the water-dispersed resin, it is preferable that it is a polymer having both a hydrophilic portion and a hydrophobic part in the molecule. By having a hydrophobic part, it is possible that a hydrophobic part will be orientated to the inside of the water-dispersed resin, and a hydrophilic portion will be effectively orientated to the outside of the water-dispersed resin. As a result, the change of a dispersion state in response to the pH change of a liquid will become larger, and aggregation of the ink will be performed more efficiently.

Examples of commercially available water-dispersed resin emulsions include: Joncryl 537 and 7640 (styrene-acrylic resin emulsion, made by Johnson Polymer Co., Ltd.), Microgel E-1002 and E-5002 (styrene-acrylic resin emulsion, made by Nippon Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.), Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.), acrylic copolymer emulsions of DSM Neoresins, e.g. the NeoCryl product line, in particular acrylic styrene copolymer emulsions NeoCryl A-662, NeoCryl A-633, NeoCryl A-1131, NeoCryl A-2091, NeoCryl A-550, NeoCryl BT-101, NeoCryl SR-270, NeoCryl XK-52, NeoCryl XK-39, NeoCryl XK-205 NeoCryl A-1044, NeoCryl A-1049, NeoCryl A-1110, NeoCryl A-1120, NeoCryl A-1127, NeoCryl A-2092, NeoCryl A-2099, NeoCryl A-308, NeoCryl A-45, NeoCryl A-615, NeoCryl BT-24, NeoCryl BT-26, NeoCryl BT-36, NeoCryl XK-15, NeoCryl X-151, NeoCryl XK-232, NeoCryl XK-234, NeoCryl XK-237, NeoCryl XK-238-NeoCryl XK-86, NeoCryl XK-90 and NeoCryl XK-95 However, the water-dispersed resin emulsion is not limited to these examples.

As the fluorine-based resin, fluorine-based resin fine particles having a fluoroolefin unit are preferred. Of these, fluorine-containing resin fine particles containing a fluoroolefin unit and a vinylether unit are particularly preferable. The fluoroolefin unit is not particularly limited and may be suitably selected in accordance with the intended use. Examples thereof include —$CF_2CF_2$—, —$CF_2CF(CF_3)$—, and —$CF_2CFCl$—.

The vinylether unit is not particularly limited and may be suitably selected in accordance with the intended use. Examples thereof include —$C(R_a)HC(ORb)$—; wherein $R_a$ is a hydrogen atom or a methyl group; and wherein Rb may be selected from the group consisting of —$CH_2R_c$, —$C_2H_4R_c$, —$C_3H_6R_c$, —$C_4H_8R_c$ and —$O_5H_{10}R_c$, wherein $R_c$ is selected from the group consisting of a hydrogen atom (—H), an hydroxy group (—OH) or a carboxylic acid group (—COOH)

As the fluorine-containing vinylether-based resin fine particles containing a fluoroolefin unit and a vinylether unit, an alternated copolymer, in which the fluoroolefin unit and the vinylether unit are alternately copolymerized, is preferable. As such a fluorine-based resin fine particles, a suitably synthesized compound may be used and a commercially available product may be used. Examples of the commercially available products include FLUONATE FEM-500 and FEM-600, DICGUARD F-52S, F-90, F-90M, F-90N and AQUAFURFURAN TE-5A produced by Dainippon Ink Chemical Industries Co., Ltd.; LUMIFLON FE4300, FE4500, FE4400, ASAHI GUARD AG-7105, AG-950, AG-7600, AG-7000, and AG-1100 produced by Asahi Glass Co., Ltd.

The water-dispersed resin may be used in the form of a homopolymer, a copolymer or a composite resin, and all of water-dispersed resins having a monophase structure or core-shell structure and those prepared by power-feed emulsion polymerization may be used. As the water-dispersed resin, it is possible to use a resin which in itself has a hydrophilic group and hence has a certain degree of selfdispersibility, and a resin which in itself has no dispersibility but to which the dispersibility is imparted with use of a surfactant and/or another resin having a hydrophilic group. Among these resins, an emulsion of a resin obtained by emulsion polymerization or suspension polymerization of an ionomer of a polyester resin or a polyurethane resin is most suitably used. In the case of emulsion polymerization of an unsaturated monomer, a resin dispersion is obtained by initiating a polymerization reaction in the dispersed monomer phase in the monomer in water emulsion. A polymerization initiator, a surfactant, a chain transfer agent, a chelating agent and a pH adjustor may be added to the monomer in water emulsion. Thus, a water-dispersed resin can be easily obtained, and the desired properties are easily obtained because the resin components can be varied.

The content of the water-dispersed resin added in the ink of the present invention is preferably from 1-40 weight % based on the total weight of the ink, and it is more preferably from 1.5-30 weight %, and it is still more preferably from 2-25 weight %. Even more preferably, the amount of the water-dispersed resin contained in the inkjet ink, as a solid content, is 2.5 weight % to 15 weight %, and more preferably 3 weight % to 7 weight %, relative to the total ink composition.

Inks may comprise additives such as cosolvents and surfactants which are not limited to any kind and may be similar to the cosolvents and surfactants used in reaction liquids according to the present invention as described above.

An ink set according to the present invention comprises a reaction liquid according to the present invention and an ink composition as described above.

Printing Method

A reaction liquid according to the present invention can be applied to a recording substrate by means of any application method, in particular ink jet printing. A printing method is for example disclosed in published International Patent Application WO2013/131924, which is hereby incorporated by reference.

EXAMPLES

Materials

Choline-formate was synthesized by gradually adding choline-carbonate to formic acid present in a beaker in an ice bath. The addition was performed under vigorous stirring. The reaction was completed when stoichiometric proportions were reached.

All other chemicals used (including formic acid and choline-carbonate used in the above synthesis) in the examples were obtained from Sigma Aldrich, unless stated otherwise. All chemicals were used as received, unless stated otherwise.

Media:

Soporset Premium Offset 80 g/m² is obtained from The Navigator Company.

Methods

Water Activity (Wa)

Vapor pressures of the aqueous reaction liquid and of pure water are measured at 25° C. using a MiniVap VPXpert (grabner-instruments). The water activity (Wa) at 25° C. is calculated by dividing the measured vapor pressure of the aqueous reaction liquid by the vapor pressure of pure water. The vapor pressure measurement is in accordance with ASTM D6377 (Vapor Pressure of Gasoline).

Cockling Test and Test Set-Up

FIG. 1 shows a schematic representation of the used cockling testing method and set up. The testing method is shown in five stages (I-V). The left hand side drawing shows a top view of the set-up; the right hand side drawing shows a side view of the set-up.

Stage I: a pressurized suction box (1) with suction holes (2) is provided. The suction box can provide an under pressure (partial vacuum) in the range of 0 to −4000 Pa;

Stage II: A piece of test paper (3) which is a sheet of 235×82 mm of Soporset Premium Offset 80 g/m² is placed onto the suction box and held down by a suction force in the above indicated range. For clarity, the sheet is drawn slightly off-set with respect to the suction box;

Stage III: A piece of coated paper (4) is placed on top of a part of the surface of the test paper (3). With a micro-pipet 200 µl aqueous reaction liquid composition according to the invention (5) is applied to the piece of coated paper (4);

Stage IV: A 8 µm rod coater (not shown) is used to pull a layer (6) of test liquid on the test paper. The coated part is approximately 4 cm wide and located in the center part of the test paper, hence leaving approximately 2 cm uncoated at both sides enabling building in stresses;

Stage V: A line profile laser sensor (7) is arranged to detect the occurrence of cockling, time to cockle and cockle height. The cockle height and time to cockle are determined in threefold.

Examples 1-3: Preparation and Testing of Test Liquids Comprising an Anti-Deforming Agent According to the Present Invention Aqueous test liquids were prepared by preparing a concentrated solution (close to saturation, which is different for each compound). The water activity of the solutions was measured in accordance with the method described above. Several dilutions with water of the concentrated solutions were prepared. For all dilutions, the water activity was measured in accordance with the method described above. Then for all test liquids the cockling test was performed (all in threefold). The time to cockle (ms) and the cockling height (mm) were determined. The tested anti-deforming agents were: choline-formate, choline-acetate and trimethyl glycine (betaine).

Comparative Example A: Preparation and Testing of a Test Liquid Comprising $MgCl_2$ (not According to the Present Invention)

Example 1 was repeated with magnesium chloride as anti-deforming agent.

Figure 2:
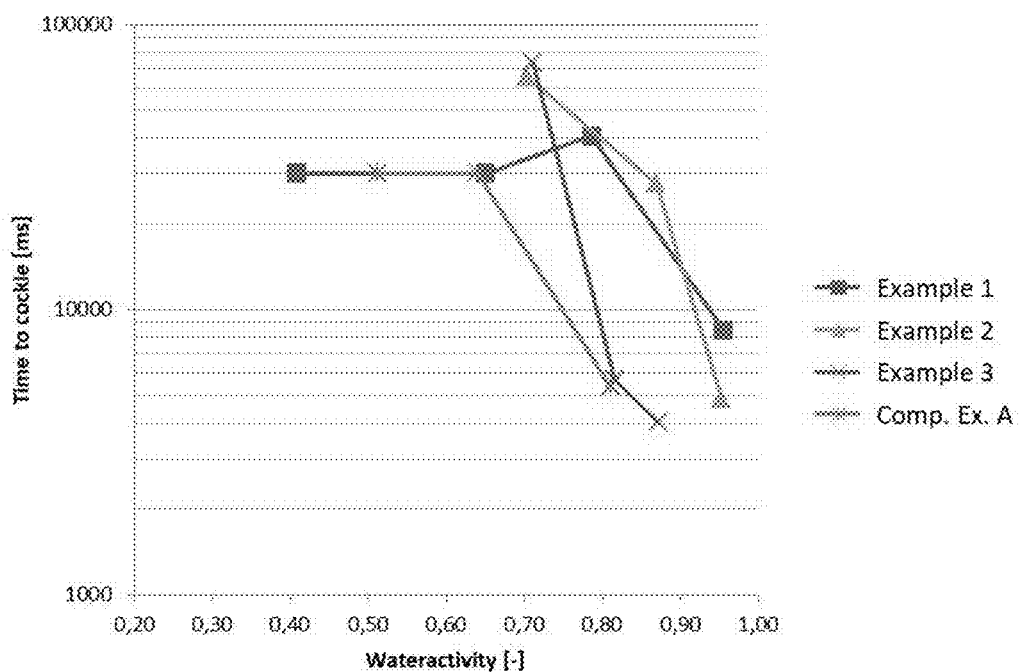
FIG. 2 shows a graph of the time to cockle as a function of water activity for aqueous solutions comprising an anti-deforming agent in accordance with the present invention.
Figure 3:
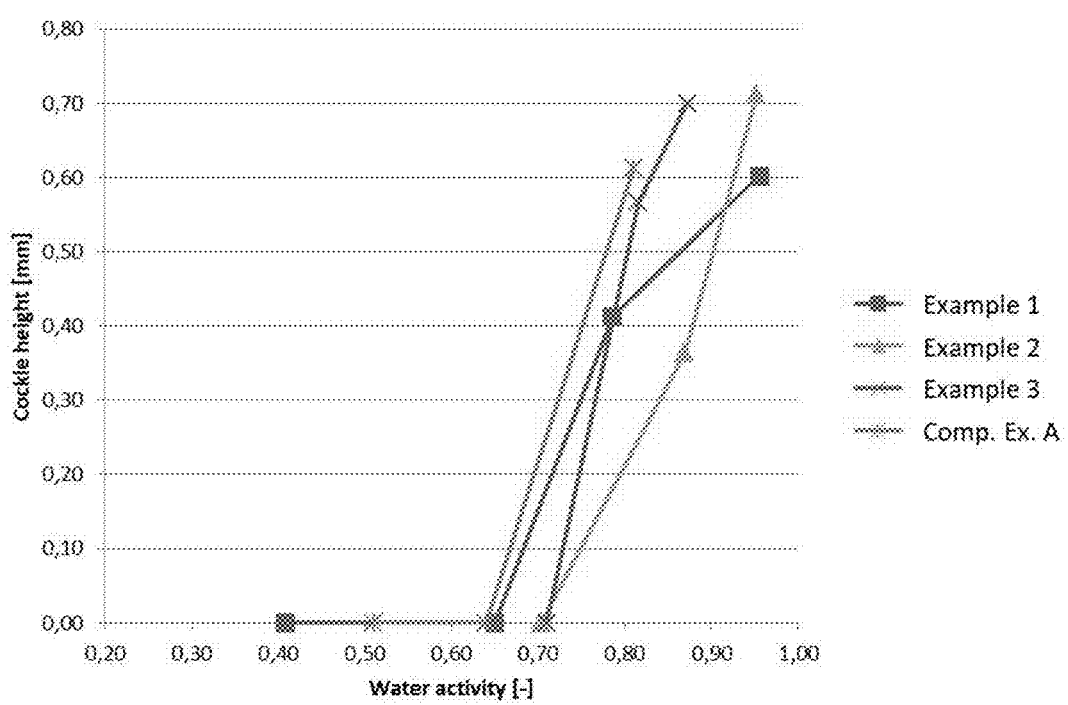
FIG. 3 shows a graph of the cockle height as a function of water activity for aqueous solutions comprising an anti-deforming agent in accordance with the present invention.

The results of the comparative example and examples 1-3 are respectively shown in Table 2 and FIGS. 2 and 3.

TABLE 2

| | Wa at which time to cockle is 10000 ms and cockle height is 0.3 mm. | | |
|---|---|---|---|
| Example (curves in FIGS. 2 and 3) | anti-deforming agent | Wa at which time to cockle is 10000 ms | Wa at which cockle height is 0.3 mm |
| 1 | Choline-formate | 0.95 | 0.72 |
| 2 | Choline-acetate | 0.93 | 0.83 |
| 3 | Betaine | 0.80 | 0.76 |
| Comp. Ex. A | $MgCl_2$ | 0.75 | 0.70 |

It is observed from FIGS. 2 and 3 that by reducing the water activity, the time to cockle and the cockle height significantly improve. The postponement of cockling is successful and the height of the cockles has been reduced. From FIGS. 2 and 3 and Table 2 it can be concluded that for the present examples the Wa is preferably below 0.7.

It is further be observed that when using an anti-deforming agent in accordance with the present invention, the time to cockle also improves when compared to e.g. $MgCl_2$ at relatively high water activities, in particular choline-formate and choline-acetate show this behavior. At lower Wa, the time to cockle further increases for these anti-deforming agents further improve. Therefore, at the claimed Wa (below 0.90), these components will reduce cockling extremely well.

Examples 4-5: Preparation of Aqueous Reaction Liquids Comprising a Deep Eutectic Solvent The components as disclosed in Table 3 were mixed until a solution was obtained. The water activity of the solutions was measured in accordance with the method described above. Several dilutions were made with a diluter comprising 49.5 wt % betaine, 5.5 wt % urea, 43.0 wt % water and 2 wt % 1,2 hexanediol. For all dilutions, the water activity was measured in accordance with the method described above. Then for all test liquids the cockling test was performed (all in threefold). The time to cockle (ms) and the cockling height (mm) were determined. The results are respectively shown in Table 4 and FIGS. 4 and 5

TABLE 3

Compositions of aqueous reaction liquids of Examples 4 and 5

| Component | Example 4 | Example 5 |
| --- | --- | --- |
| Urea | 18 gr | 35 gr |
| potassium-formate | 52 gr | — |
| ammonium-nitrate | — | 45 gr |
| 1,2 hexanediol | | 1 gr |
| Multiwet-SU (surfactant, obtained from Croda Coatings & Polymers) | | 0.7 gr |
| water | 30 gr | 20 gr |

TABLE 4

Wa at which time to cockle is 10000 ms and cockle height is 0.3 mm.

| Example (curves in FIGS. 4 and 5) | Deep Eutectic Solvent | Wa at which time to cockle is 10000 ms | Wa at which cockle height is 0.3 mm |
| --- | --- | --- | --- |
| 4 | Urea/potassium-formate | not determined | not determined |
| 5 | Urea/ammonium-nitrate | 0.65 | 0.57 |

Figure 4:
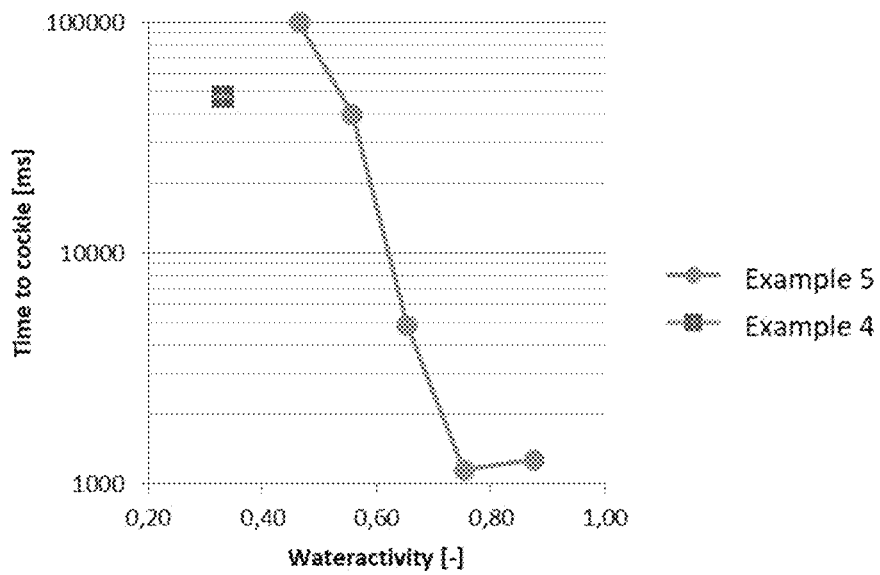
FIG. 4 shows a graph of the time to cockle as a function of water activity for aqueous solutions comprising a Deep Eutectic Solvent (DES)
Figure 5:
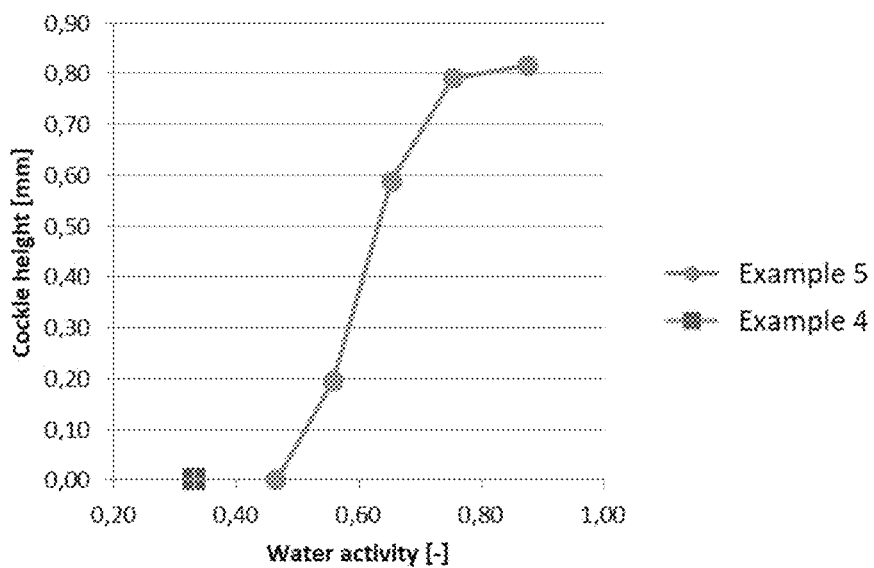
FIG. 5 shows a graph of the cockle height as a function of water activity for aqueous solutions comprising a Deep Eutectic Solvent (DES)

It is observed from FIGS. 4 and 5 that by reducing the water activity, the time to cockle and the cockle height significantly improve. The postponement of cockling is successful and the height of the cockles has been reduced. From FIGS. 4 and 5 and Table 4 it can be concluded that for the present examples the Wa is preferably below approximately 0.6.

Example 6: Preparation of Ink Composition

The components disclosed in Table 5 were mixed in order to obtain an ink composition with the relative amounts of the components disclosed in the most right column of Table 5.

Water, glycerol, pentanediol, 1,2-hexanediol and biocide were mixed with a magnetic stirrer for 2 minutes. During stirring Neorez R4000, Cab-o-jet-4500 and ML190E were added. Finally Dynol800 was added. The obtained mixture was stirred for 1 hour and filtered over a 1.5 µm filter (Pall).

TABLE 5

Ink composition

| | Component | Supplier | Amount (g) | load or solid content (wt %) | wt % pure component/solid content |
| --- | --- | --- | --- | --- | --- |
| cosolvent | glycerol | Sigma Aldrich | 13.00 | 100 | 13.00 |
| cosolvent | 1,5-pentanediol | Sigma Aldrich | 3.00 | 100 | 3.00 |
| cosolvent | 1,2-hexanediol | Sigma Aldrich | 1.00 | 100 | 1.00 |
| dispersed polymer | Neorez R4000 | DSM | 33.80 | 35.5 | 12.00 |
| pigment dispersion | Cabot IJX C | Cabot | 26.67 | 15 | 4.00 |
| wax dispersion | ML190E | Michelman | 2.86 | 35 | 1.00 |
| surfactant | Dynol 800 | Evonik | 1.00 | 100 | 1.00 |
| biocide | BIT | Lonza | 0.10 | 20 | 0.02 |
| water | | | 18.57 | NA | 64.98 |

Example 7: Printing Experiments

The aqueous reaction liquid composition according to example 6 was printed with a Kyocera 600 dpi KJ4B print head on substrate Soporset Premium Offset 80 $g/m^2$ which was sucked down with −500 Pa partial vacuum. The reaction liquid was printed in coverages ranging from 1-9 $g/m^2$, which was immediately followed by printing the ink composition according to example 9 in a layer of 8.5 $g/m^2$. Immediately thereafter the time to cockle (time for first cockle) is measured in accordance with the previously disclosed method.

The time to cockle as a function of coverage with reaction liquid is determined.

Example 8: Printing Experiments

Example 7 was repeated but 1 second after printing the ink on top of the reaction liquid, the vacuum pressure was released for 0.16 seconds to simulate the gap between a transport mechanism (belt) on the print zone and a transport mechanism in the drying/fixation zone.

Figure 6:
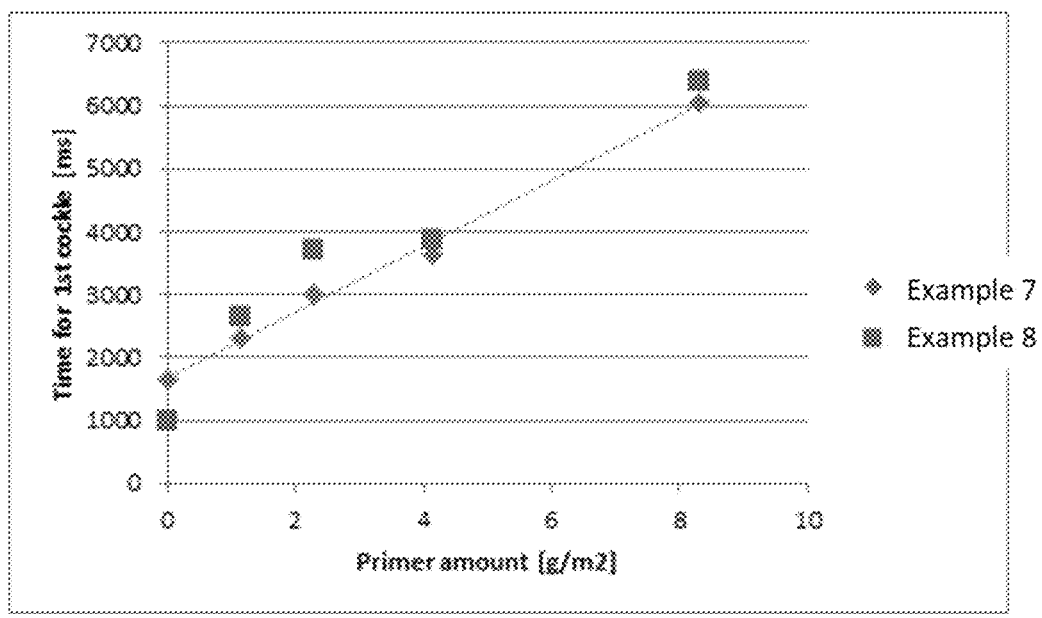
FIG. 6 shows a graph of the time for first cockle as a function of the used amount of aqueous reaction liquid according to the present invention.

FIG. 6 shows the results of examples 7 and 8. It can be concluded that even low coverages with reaction liquid according to the present invention delays the time to (first cockle) for both examples 7 and 8.

In conclusion, the aqueous reaction liquid according to the present invention is capable of postponing cockling sufficiently for bridging the gap between the substrate transport mechanism in the printing zone of a printer and the substrate transport mechanism in the drying/fixation zone of a printer without substrate deformation.

The invention claimed is:
1. An aqueous pre-treatment composition for use in inkjet printing comprising:
   an anti-deforming agent, selected from the group consisting of a choline salt, a guanidine salt, and potassium formate,
   wherein the anti-deforming agent is present in the aqueous pre-treatment composition in an effective amount such that a water activity of the aqueous pre-treatment composition is below 0.9, the water activity of the aqueous pre-treatment composition being determined by dividing a vapor pressure of the aqueous pre-treatment composition by a vapor pressure of pure water, both determined at 25° C. and in accordance with ASTM D6377.

2. The aqueous pre-treatment composition according to claim 1, wherein the anti-deforming agent is the choline salt, which is selected from the group consisting of choline-formate, choline-acetate and choline-chloride.

3. The aqueous pre-treatment composition according to claim 1, wherein the anti-deforming agent is the guanidine salt, which is selected from the group consisting of guanidine-formate, guanidine-acetate and guanidine-chloride.

4. The aqueous pre-treatment composition according to claim 1, wherein the anti-deforming agent is selected from the group consisting of choline-formate, choline-acetate and guanidine-formate.

5. An aqueous pre-treatment composition for use in inkjet printing comprising:
an anti-deforming agent, selected from the group consisting of a choline salt, a guanidine salt, trimethylglycine, potassium formate and ammonium nitrate,
wherein the aqueous pre-treatment liquid further comprises urea so as to form a deep eutectic solvent with the anti-deforming agent.

6. The aqueous pre-treatment composition according to claim 5, wherein the anti-deforming agent is selected from the group consisting of: trimethylglycine (betaine), potassium formate, ammonium nitrate, choline-chloride, choline-acetate and choline-formate.

7. The aqueous pre-treatment composition according to claim 5, wherein a molar ratio of anti-deforming agent:urea is between 1:0.5 and 1:2.0.

8. The aqueous pre-treatment composition according to claim 5, wherein the deep eutectic solvent is present in a total effective amount with reference to the total aqueous pre-treatment composition, such that a water activity of the aqueous pre-treatment composition is below 0.9, the water activity of the aqueous pre-treatment composition being determined by dividing a vapor pressure of the aqueous pre-treatment composition by a vapor pressure of pure water, both determined at 25° C. and in accordance with ASTM D6377.

9. The aqueous pre-treatment composition claim 1, further comprising a metal salt.

10. The aqueous pre-treatment composition according to claim 9, wherein the metal salt comprises a polyvalent metal ion, which is selected from the group consisting of: $Ca^{2+}$, $Mg^{2+}$, $Sr^{2+}$, $Zn^{2+}$, $Cu^{2+}$, $Ni^{2+}$, $Fe^{3+}$, $Cr^{3+}$ and $Al^{3+}$.

11. The aqueous pre-treatment composition according to claim 9, wherein the metal salt comprises an anion selected from the group consisting of: nitrate, sulfate, formate, acetate and propionate.

12. The aqueous pre-treatment composition according to claim 9, wherein the metal salt is present in an amount of at least 15 wt % relative to the total aqueous pre-treatment composition.

13. An ink set comprising the aqueous pre-treatment composition claim 1 and an ink composition comprising dispersed particles that upon contact with the aqueous pre-treatment composition agglomerate.

14. The ink set according to claim 13, wherein the dispersed particles comprised in the ink composition comprise latex particles and/or pigment particles.

15. A method of printing comprising the steps of:
providing the aqueous pre-treatment composition according to claim 1; an ink composition comprising dispersed particles that upon contact with the salt comprised in the pre-treatment composition agglomerate; and a print substrate;
applying the pre-treatment composition to a surface of the print substrate;
applying the ink composition to a surface of the print substrate.

16. The aqueous pre-treatment composition claim 5, further comprising a metal salt.

17. An ink set comprising the aqueous pre-treatment composition claim 5 and an ink composition comprising dispersed particles that upon contact with the aqueous pre-treatment composition agglomerate.

18. A method of printing comprising the steps of:
providing the aqueous pre-treatment composition according to claim 5; an ink composition comprising dispersed particles that upon contact with the salt comprised in the pre-treatment composition agglomerate; and a print substrate;
applying the pre-treatment composition to a surface of the print substrate;
applying the ink composition to a surface of the print substrate.

* * * * *